United States Patent
Chuang

(10) Patent No.: US 11,390,465 B2
(45) Date of Patent: Jul. 19, 2022

(54) MODULAR SENSING DEVICE AND CONVEYOR HAVING THE SAME

(71) Applicant: SCAN ELECTRONIC INDUSTRIAL CO., Tainan (TW)

(72) Inventor: Shan-Lung Chuang, Tainan (TW)

(73) Assignee: SCAN ELECTRONIC INDUSTRIAL CO., Tainan (TW)

( * ) Notice: Subject to any disclaimer, the term of this patent is extended or adjusted under 35 U.S.C. 154(b) by 0 days.

(21) Appl. No.: 17/075,429

(22) Filed: Oct. 20, 2020

(65) Prior Publication Data
US 2022/0119201 A1   Apr. 21, 2022

(51) Int. Cl.
*B65G 43/08* (2006.01)
*G01S 15/88* (2006.01)
*G01S 15/04* (2006.01)

(52) U.S. Cl.
CPC .............. *B65G 43/08* (2013.01); *G01S 15/04* (2013.01); *G01S 15/88* (2013.01); *B65G 2203/0233* (2013.01); *B65G 2203/042* (2013.01)

(58) Field of Classification Search
CPC ....... G01S 2203/042; G01S 2203/0233; G01S 15/884; G01S 15/04; B65G 43/08; B65G 2203/0233; B65G 2203/042
USPC ......................................................... 198/10
See application file for complete search history.

(56) References Cited

U.S. PATENT DOCUMENTS

| | | | | |
|---|---|---|---|---|
| 6,062,453 A | * | 5/2000 | Murray | B65H 23/038 198/807 |
| 6,116,274 A | * | 9/2000 | Ehrlich | F16K 37/0058 137/528 |
| 7,219,791 B2 | * | 5/2007 | Shoji | G03G 15/55 198/608 |
| 7,681,926 B2 | * | 3/2010 | Valaskovic | G02B 6/3809 285/342 |
| D735,061 S | * | 7/2015 | Laforest | D10/46 |
| 10,850,928 B1 | * | 12/2020 | Luer | G01S 15/04 |
| 11,292,670 B2 | * | 4/2022 | Zhou | B65G 43/08 |

FOREIGN PATENT DOCUMENTS

CN        203385432 U  *  1/2014
DE    102020207230 A1  *  12/2021

* cited by examiner

*Primary Examiner* — Gene O Crawford
*Assistant Examiner* — Lester Rushin, III
(74) *Attorney, Agent, or Firm* — Birch, Stewart, Kolasch & Birch, LLP

(57) ABSTRACT

A modular sensing device has multiple assembling components, and at least one object-detection sensor. The assembling components extend along a direction. Each one of the assembling components has a housing being tubular and an electrical connecting device mounted inside the housing. The housings of the multiple assembling components are detachably connected in sequence. The at least one object-detection sensor is mounted to one of the assembling components. The electrical connecting devices of the assembling components are electrically connected in sequence and are electrically connected to the at least one object-detection sensor. The detachable housings of the assembling components make the modular sensing device applicable to conveyors of different widths and promote flexibility of installation.

19 Claims, 8 Drawing Sheets

MODULAR SENSING DEVICE AND CONVEYOR HAVING THE SAME

BACKGROUND OF THE INVENTION

1. Field of the Invention

The present invention relates to a detecting device, and more particularly to a modular sensing device suitable for conveyors of different widths.

2. Description of Related Art

There are a number of different kinds of conventional detection devices that can be used on conveyor systems such as traditional thru-beam sensors, retro-reflective sensors, diffuse reflective photoelectric sensors, and ultrasonic sensors. The conventional detection devices can be mounted to a conveyor and disposed above rollers of the conveyor to detect passing objects. However these sensors may protrude from the system, causing interference with movements of objects that are moved onto and off the conveyor. Currently available photoelectric and ultrasonic sensing devices designed specifically for roller conveyors have drawbacks as well. Some conventional detection devices, through geometric optics, can sense the objects from underneath the rollers passing overhead. These detection devices may have limitations in detection range and have blind spots on detection.

Other conventional detection devices are provided, such as the detection device disclosed in U.S. Pat. No. 8,978,878 having sensors enclosed in a single elongated tubular housing. The entire detection device is mounted parallel to rollers and between two of the rollers. This detection device has several limitations, one of the limitations being the length of the detection device is fixed and thus cannot be applied to conveyors having different widths as needed. It requires the manufacturer of these detection devices to offer a large number of specifications of the detection devices having different lengths, so as to be suitable for conveyors of varying sizes.

Furthermore depending on position of the detecting device relative to the rollers, there could be areas in between sensing modules that are not covered by light or ultrasonic beams, leading to blind spots where smaller objects could pass undetected. Since the number and positions of detectors on the detection devices are fixed, in applications where passing objects are large enough so that only few detectors are needed, this detecting device does not allow the flexibility to alter the number of detectors accordingly. With this design if ever one detector fails, the entire device would need to be replaced. Lastly due to the long fixed profile of the detecting device, shipping requires specialized packaging and care.

To overcome the shortcomings of the conventional sensors, the present invention provides a modular sensing device and a conveyor having the modular sensing device to mitigate or obviate the aforementioned problems.

SUMMARY OF THE INVENTION

The main objective of the present invention is to provide a modular sensing device that promotes flexibility of installation and is suitable for conveyors of different widths.

The modular sensing device has multiple assembling components, and at least one object-detection sensor. The assembling components extend along a direction. Each one of the assembling components has a housing being tubular and an electrical connecting device mounted inside the housing. The housings of the multiple assembling components are detachably connected in sequence. The at least one object-detection sensor is mounted to one of the assembling components. The electrical connecting devices of the assembling components are electrically connected in sequence and are electrically connected to the at least one object-detection sensor. The detachable housings of the assembling components make the modular sensing device applicable to conveyors of different widths and promote flexibility of installation.

Other objects, advantages, and novel features of the invention will become more apparent from the following detailed description when taken in conjunction with the accompanying drawings.

DETAILED DESCRIPTION OF PREFERRED EMBODIMENTS

Figure 1:
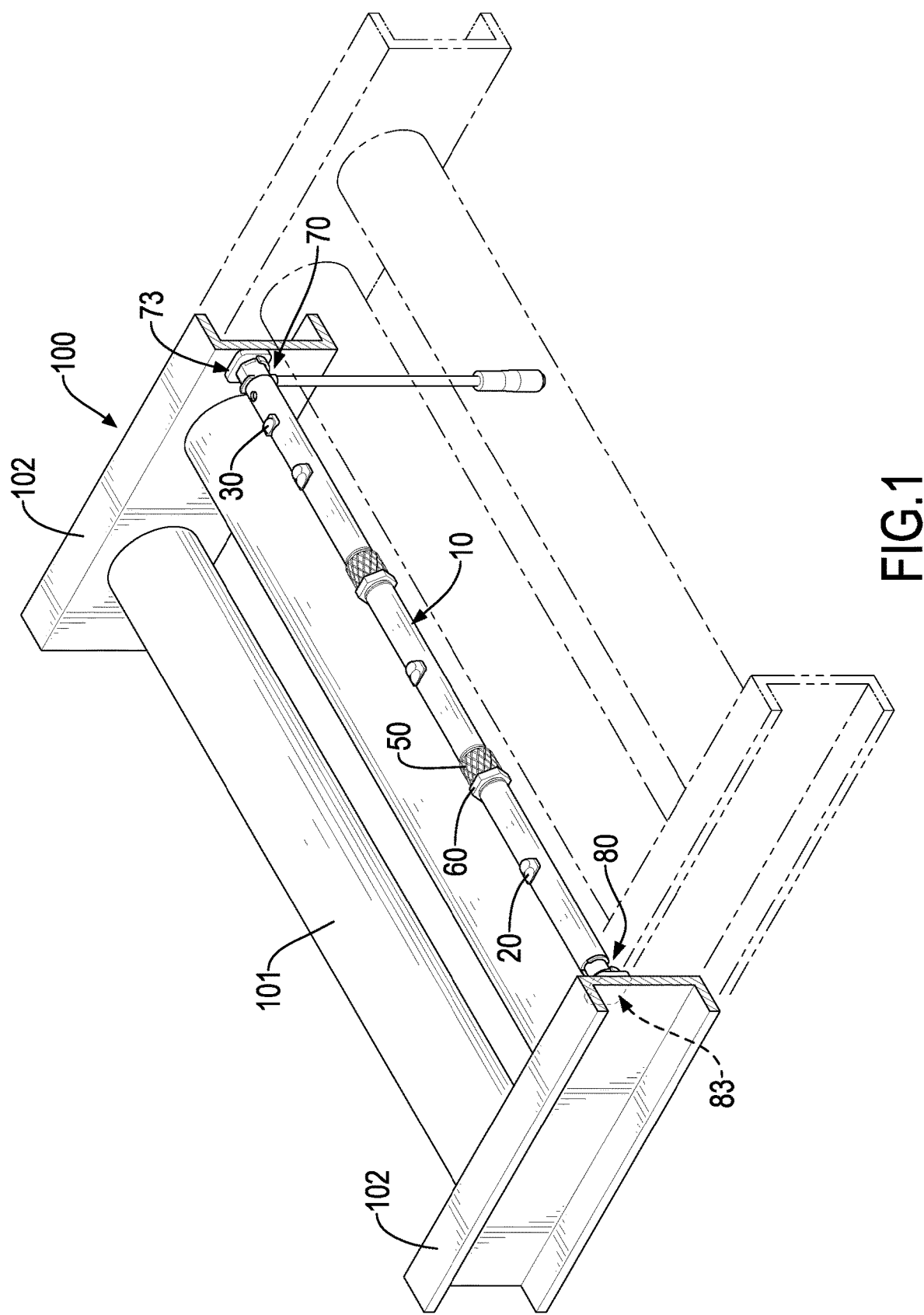
FIG. 1 is a perspective view of a first embodiment of a modular sensing device in accordance with the present invention, showing the modular sensing device mounted to a roller conveyor.

With reference to FIG. 1, a first embodiment of a modular sensing device in accordance with the present invention is applied to a roller conveyor 100 with multiple rollers 101 and two side walls 102. The multiple rollers 101 are disposed between the two side walls 102, rotatably mounted to the two side walls 102, and supported by the two side walls 102. Each one of the multiple rollers 101 are rotatable and having two opposite ends respectively mounted to the two side walls 102.

With reference to FIGS. 2 to 5, in the first embodiment, the modular sensing device has three assembling components 10, three object-detection sensors 20, an indicator light 30, two connecting nuts 50, two jam nuts 60, a beginning installation assembly 70, and a terminal installation assembly 80.

Figure 2:
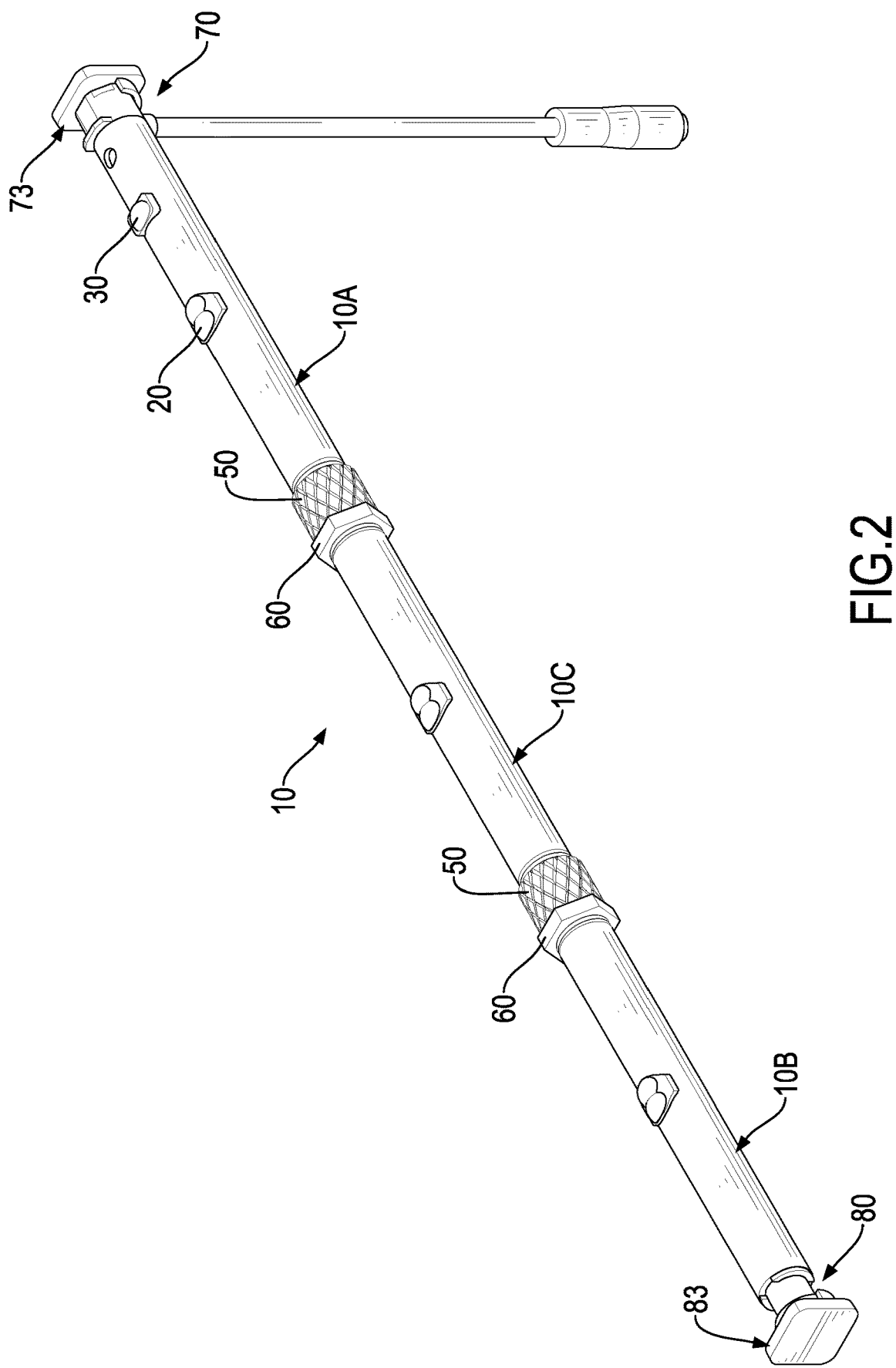
FIG. 2 is a perspective view of the modular sensing device in FIG. 1.
Figure 3:
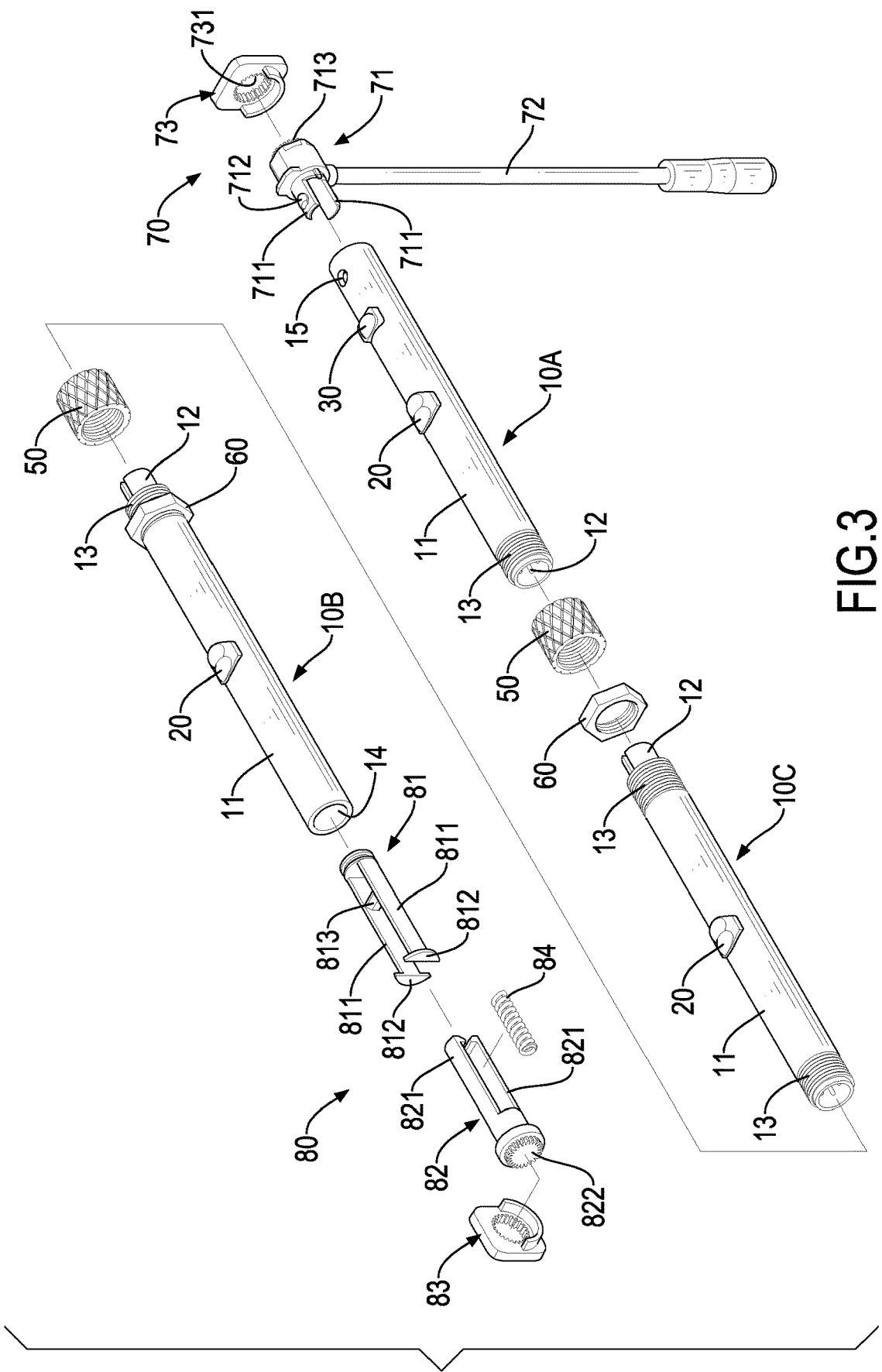
FIG. 3 is an exploded perspective view of the modular sensing device in FIG. 1.
Figure 4:
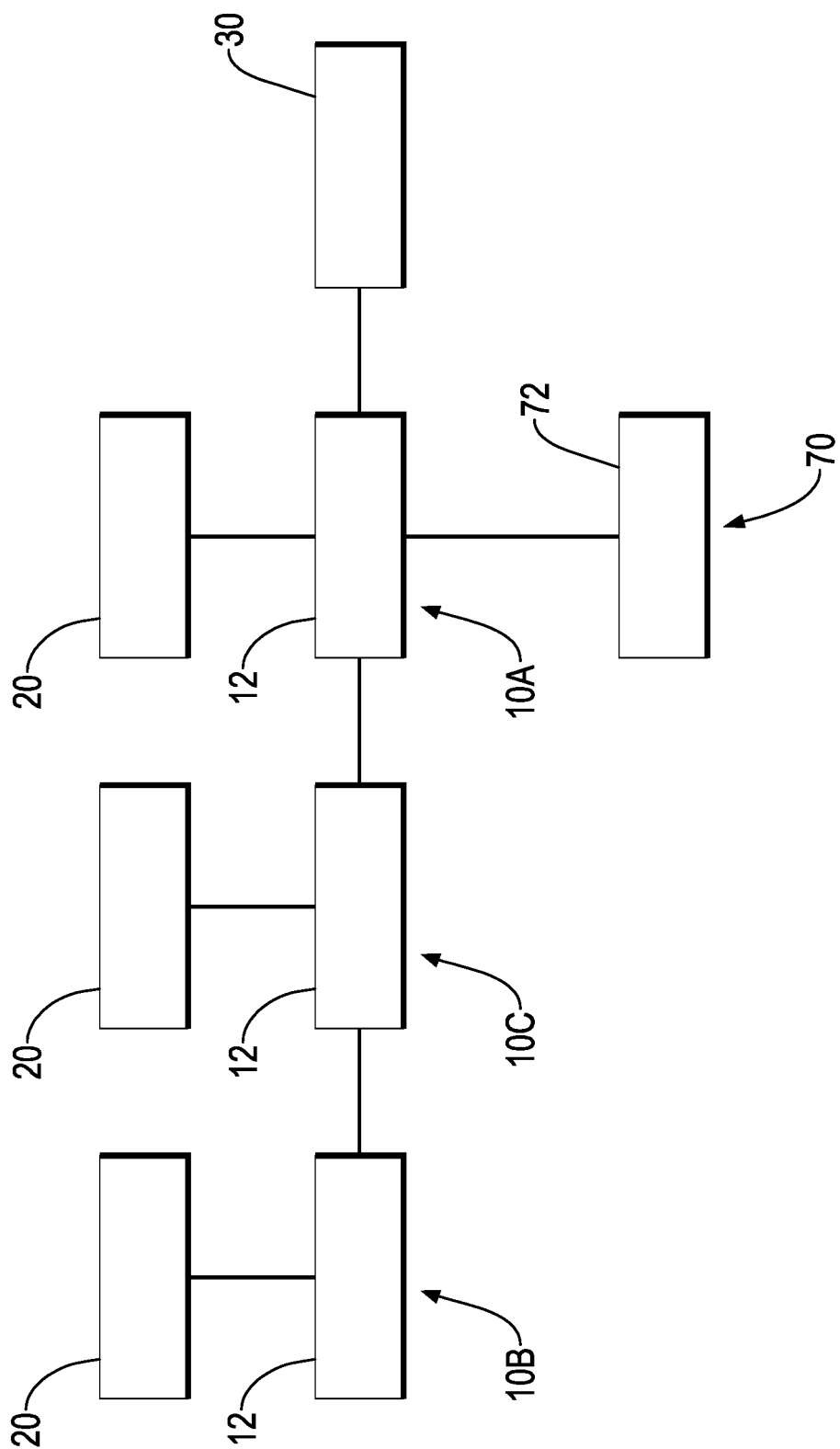
FIG. 4 is a block diagram of the modular sensing device in FIG. 1, showing an indicator light, object-detection sensors, electrical connecting devices, and a connecting cable electrically connected together.

With reference to FIGS. 2 to 4, the three assembling components 10 extend along a direction and have a beginning end and a terminal end. The beginning end and the terminal end of the three assembling components 10 are disposed opposite each other. Each one of the multiple assembling components 10 has a housing 11 and an electrical connecting device 12. The housing 11 is tubular. The electrical connecting device 12 is mounted inside the housing 11 and has an engaging structure. The housings 11 of the three assembling components 10 are detachably connected in sequence and extend along a direction. The three assembling components 10 are detachably connected in sequence via the housings 11. The electrical connecting devices 12 of the three assembling components 10 are electrically connected in sequence and are electrically connected to the three object-detection sensors 20. The electrical connecting devices 12 of the multiple assembling components 10 engage with one another via the engaging structures, and accordingly the assembling components 10 cannot rotate. The electrical connecting devices 12 can transmit NPN, PNP, or both NPN and PNP signals.

With reference to FIGS. 2 to 4, in the first embodiment, the object-detection sensors 20 are implemented as three object-detection sensors 20 and are respectively mounted to the three housings 11. Practically, the object-detection sensors 20 may be implemented as a single object-detection sensor 20 and mounted to one of the three housings 11. The amounts of the assembling components 10 and the object-detection sensors 20 are not restricted. Each object-detection sensor 20 may be an optical sensor or an ultrasonic sensor.

With reference to FIG. 3, in the first embodiment, one of the three assembling components 10 is defined as a beginning component 10A and is disposed at the beginning end of the three assembling components 10. The beginning component 10A has two opposite ends, an external thread 13, an opening 14, and two engaging holes 15. The external thread 13 and the opening 14 of the beginning component 10A are respectively disposed at the two opposite ends of the beginning component 10A. The opening 14 of the beginning component 10A communicates with inside of the beginning component 10A. The two engaging holes 15 are separately defined through the housing 11 of the component 10A and disposed adjacent to the opening 14 of the beginning component 10A.

With reference to FIG. 3, the other one of the three assembling components 10 is defined as a terminal component 10B and is disposed at the terminal end of the three assembling components 10. The terminal component 10B has two opposite ends, an external thread 13, and an opening 14. The external thread 13 and the opening 14 of the terminal component 10B are respectively disposed at the two opposite ends of the terminal component 10B. The opening 14 of the terminal component 10B communicates with inside of the terminal component 10B.

With reference to FIG. 3, another one of the three assembling component 10 is defined as a middle component 10C. The middle component 10C has two opposite ends and two external threads 13. The two external threads 13 are respectively disposed at the two opposite ends of the middle component 10C.

With reference to FIGS. 2 to 4, the external threads 13 of the beginning component 10A, the terminal component 10B, and the middle component 10C are connected via two connecting nuts 50. Each two connected threads 13 are connected by one of the two connecting nuts 50, and two jam nuts 60 are each respectively tightened by the two connecting nuts 50.

With reference to FIGS. 2 to 4, the beginning installation assembly 70 has an installing unit 71, a connecting cable 72, and an abutting unit 73. The installing unit 71 has two opposite ends, two resilient arms 711, two engaging protrusions 712, and an engaging portion 713. The two resilient arms 711 are disposed at one of the two opposite ends of the installing unit 71, are parallel to each other, and are resilient.

The two engaging protrusions 712 respectively protrude from the two resilient arms 711. Specifically, the two engaging holes of the beginning component are diametrically opposite to each other, and the two engaging protrusions of the installation unit protrude in opposite directions and engage in the two engaging holes of the beginning component respectively.

The engaging portion 713 is disposed at the other one of the two opposite ends of the installing unit 71 and has multiple teeth arranged circularly. The two resilient arms 711 are inserted into the opening 14 of the beginning component 10A. The two engaging protrusions 712 respectively engage in the two engaging holes 15 of the beginning component 10A. The installing unit 71 is connected to the beginning component 10A accordingly.

The connecting cable 72 is connected to a position between the two resilient arms 711 and the engaging portion 713. The connecting cable 72 is electrically connected to the electrical connecting device 12 inside the beginning component 10A and electrically connected to the three object-detection sensors 20.

The abutting unit 73 has an engaging recess 731 with multiple engaging notches 732 arranged circularly. The engaging recess 731 of the abutting unit 73 receives the engaging portion 713 of the installing unit 71. The teeth of the engaging portion 713 are respectively meshed with the engaging notches 732 of the abutting unit 73.

With reference of FIGS. 2 to 4, the indicator light 30 for showing power and status of the modular sensing device in accordance with the present invention is mounted to the beginning component 10A and electrically connected to the electrical connecting devices 12 of the beginning component 10A, the middle component 10C, and the terminal component 10C. The indicator light 30 is electrically connected to the object-detection sensors 20 and the connecting cable 72 via the electrical connecting devices 12. The connecting cable 72 may be electrically connected to a power supply to provide the object-detection sensors 20 with electrical power. The indicator light 30 shows the object-detection sensors 20 are in operation by emitting green light when electrical power is transmitted to the object-detection sensors 20. The indicator light 30 emits orange light when the object-detection sensors 20 detects an subject. The electrical connecting devices 12 transmit electrical power and signals provided by the object-detection sensors 20.

With reference to FIGS. 2 to 4, the terminal installation assembly 80 has a blocking unit 81, a pushing unit 82, an abutting unit 83, and a resilient unit 84. The blocking unit 81 has two opposite ends, two blocking arms 811, two blocking plates 812, and an abutting block 813. The two blocking arms 811 extend from one of the two opposite ends of the blocking unit 81 and are parallel to each other, and each one of the two blocking arms 811 has a terminal end. The two blocking plates 812 are respectively disposed at the two terminal ends of the two blocking arms 811. The abutting block 813 is disposed between and connected to the two blocking arms 811. The blocking unit 81 is inserted into the terminal component 10B via the opening 14 of the terminal component 10B. The blocking arms 811 are inserted inside the housing 11 of the terminal component 10B. The two blocking plates 812 abut against the housing 11 of the terminal component 10B to prevent the blocking unit 10B from being entirely inserted inside the housing 11 of the terminal component.

The pushing unit 82 has two opposite ends, two hooks 821, and an engaging portion 822. The two hooks 821 extend from the engaging portion 822 and extend toward one of the two opposite ends of the pushing unit 82 and are resilient. The engaging portion 822 is disposed at the other one of the two opposite ends of the pushing unit 82 and has multiple teeth arranged circularly. The pushing unit 82 is inserted inside the housing 11 of the terminal component 10B. The two hooks 821 hook the abutting block 813 for preventing the pushing unit 82 from detaching from the terminal component 10B.

The abutting unit 83 and the abutting unit 73 of the terminal installation assembly 80 and the beginning installation assembly 70 are similar in structure. The abutting unit 83 has an engaging recess 831 with multiple engaging notches 832 arranged circularly. The engaging recess 831 of the abutting unit 83 is mounted to the engaging portion 822 of the pushing unit 82. The teeth of the engaging portion 813 are respectively meshed with the engaging notches 832 of the pushing unit 83.

The resilient unit 84 is a compression spring with two opposite ends. The resilient unit 84 is disposed between the blocking unit 81 and the pushing unit 82. One of the two opposite ends of the resilient unit 84 abuts against the abutting block 813 of the blocking unit 80. The other one of the two opposite ends of the resilient unit 84 abuts against the pushing unit 82. Therefore, the pushing unit 82 and the abutting unit 84 connected to the pushing unit 82 can move toward or away from the blocking unit 81.

With reference to FIG. 1, when the first embodiment is installed to the roller conveyor 100, the abutting unit 73 of the beginning installation assembly 70 abuts against one of the two side walls 102 of the roller conveyor. Then, the abutting unit 83 of the terminal installation assembly 80 is pressed. As the resilient unit 84 is compressed, and the abutting unit 83 and the pushing unit 82 retract toward the blocking unit 81. When the modular sensing device in accordance with the present invention is entirely disposed between the two side walls 102, the abutting unit 83 is released. The resilient unit 84 restores and pushes the pushing unit 82 to let the abutting unit 83 abut against the other one of the two side walls 102. The modular sensing device in accordance with the present invention is firmly installed to the conveyor 100 accordingly.

The two engaging protrusions 712 of the installing unit 71 respectively engage with the two engaging holes 15 of the beginning component 10A. The engaging portion 713 of the installing unit 71 engages with the engaging recess 731 of the abutting unit 73. The three assembling components 10 cannot rotate relative to the beginning installation assembly 70 accordingly. Therefore, orientation of the three object-detection sensors 20 can be restricted to keep the object-detection sensors 20 facing upward for detection.

Figure 5:
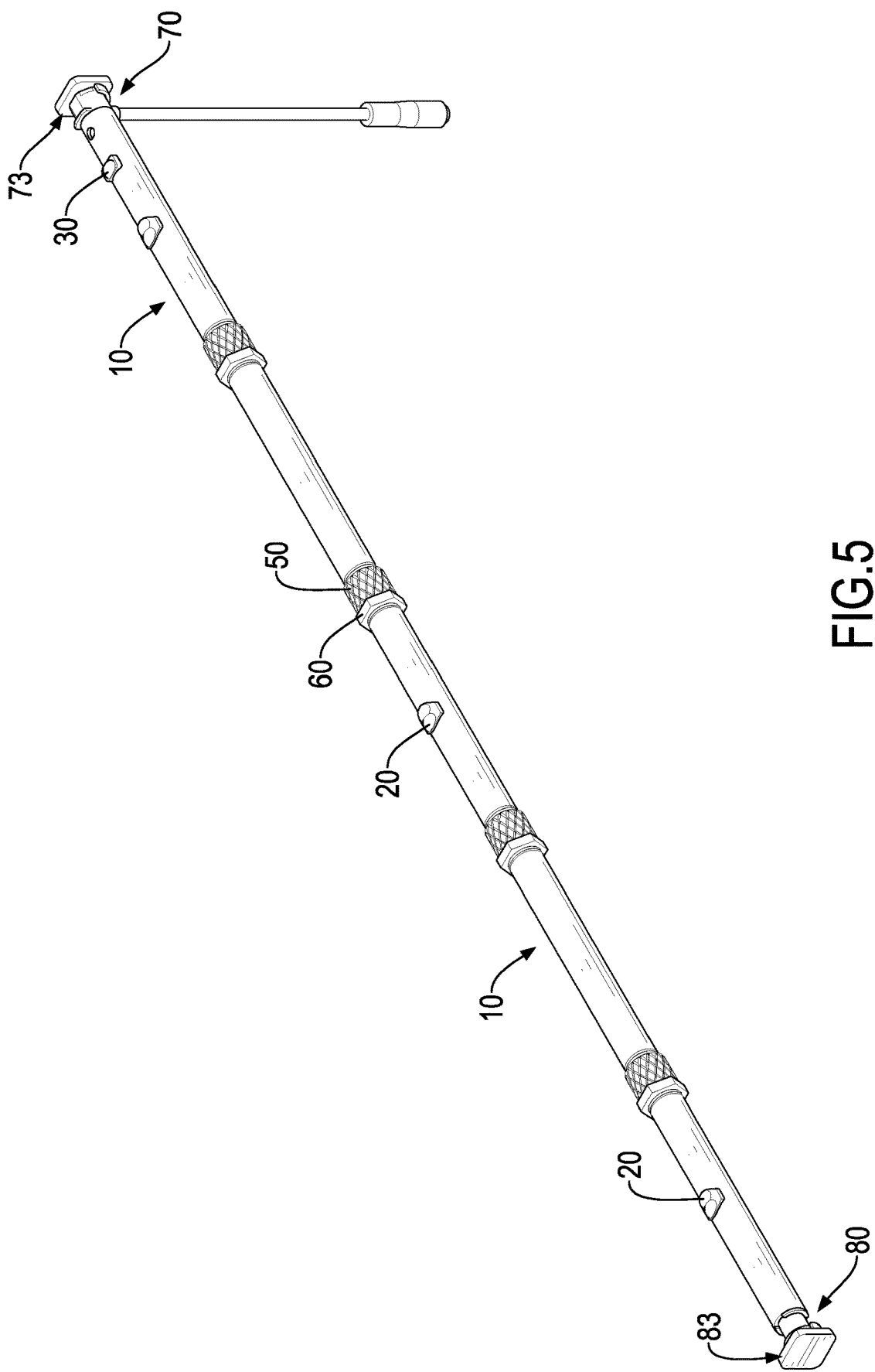
FIG. 5 is a perspective view of the modular sensing device of a second embodiment in accordance with the present invention.
Figure 6:
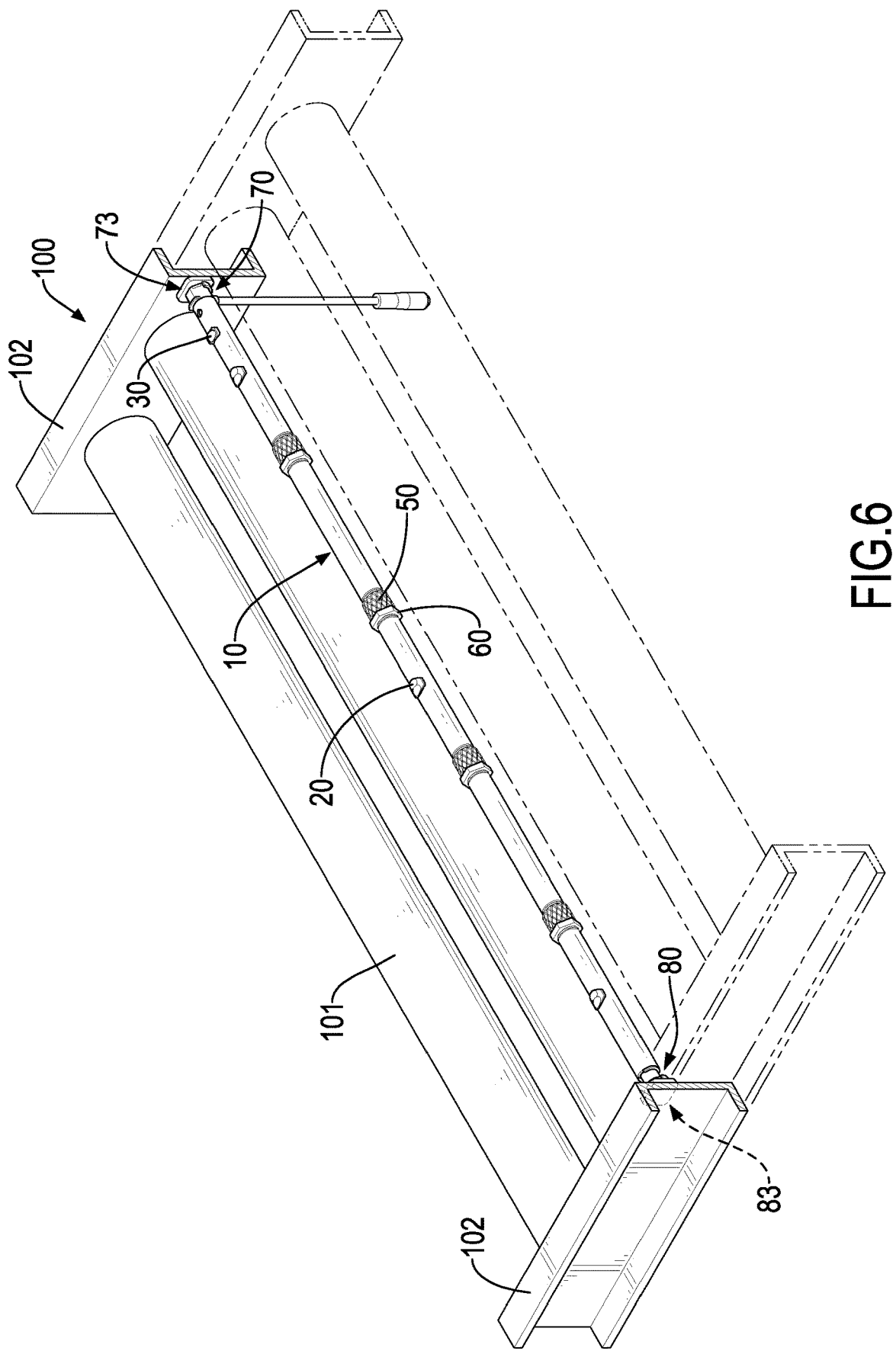
FIG. 6 is a perspective view of the modular sensing device in FIG. 5, showing the modular sensing device mounted to a roller conveyor.

A second embodiment of the modular sensing device in accordance with the present invention is applied to the roller conveyor 100 as shown in FIGS. 5 and 6. The second embodiment is similar to the first embodiment. The second embodiment also has the assembling components 10, the object-detection sensors 20, the indicator light 30, the connecting nuts 50, the jam nuts 60, the beginning installation assembly 70, and the terminal installation assembly 80.

In the second embodiment, there are five assembling components 10 and three object-detection sensors 20. The three object-detection sensors 20 are mounted to three of the five assembling components 10.

The housings 11 of the assembling components 10 of the modular sensing device in accordance with the present invention are detachably connected in sequence. The amount of the assembling components 10 and the object-detection sensors 20 is adjustable according to the width of the roller conveyor 100. Therefore, the modular sensing device in accordance with the present invention can be applied to conveyors of different widths and is suitable for conveyors of various specifications. The detachable housings 11 of the assembling components 10 of the modular sensing device in accordance with the present invention promotes flexibility of installation.

Figure 7:
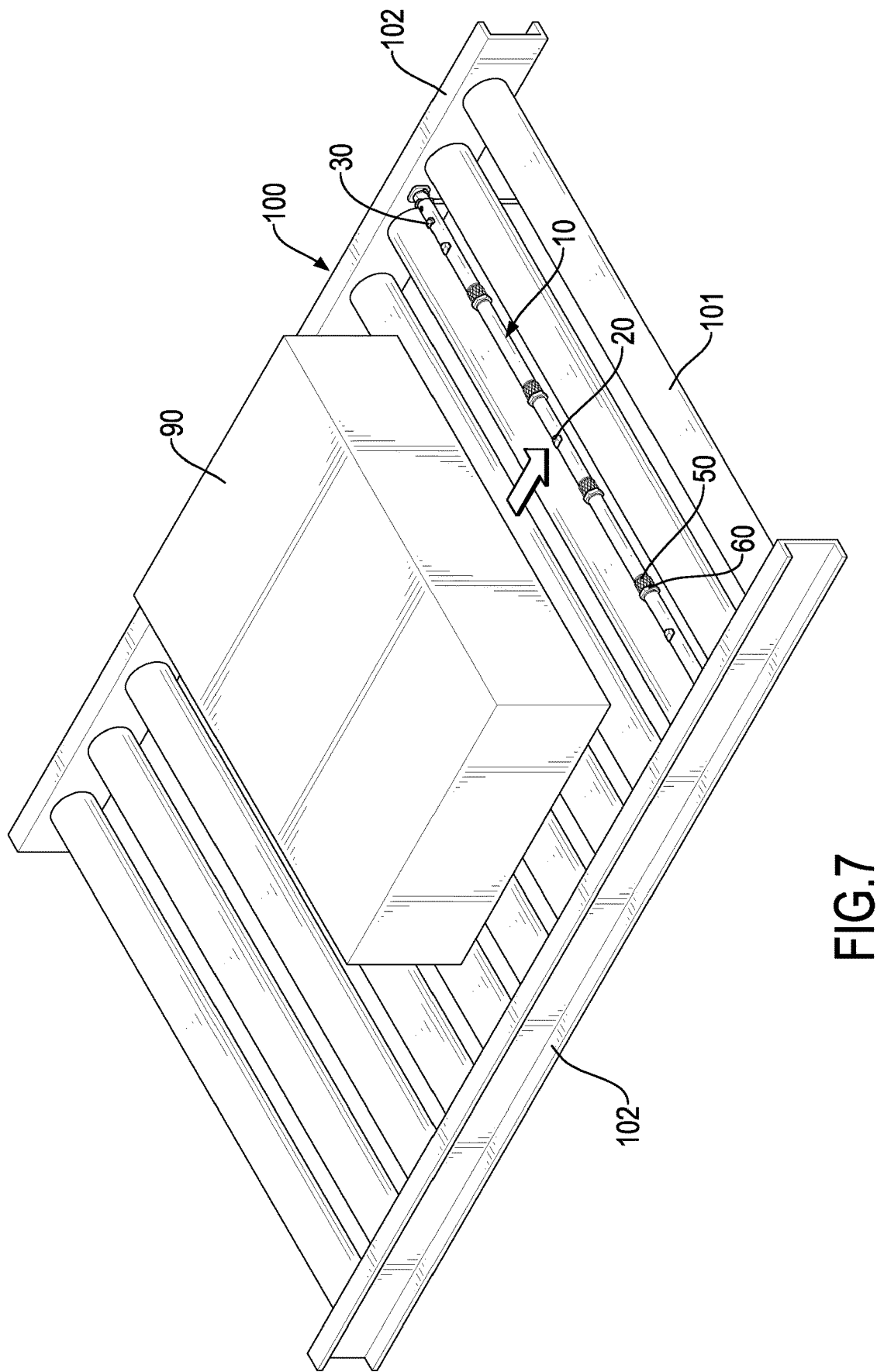
FIG. 7 is an operational perspective view of the modular sensing device in FIG. 6.

With reference to FIG. 7, the two side walls 102 are parallel to each other. The multiple rollers 101 are disposed between the two side walls 102 and are arranged along the two side walls 102. The modular sensing device in accordance with the present invention is disposed between adjacent two rollers 101. The object-detection sensors 20 of the modular sensing device face upward. When an object 90 is disposed on the rollers 101 and transmitted by the roller conveyor 100, the object-detection sensors 20 of the modular sensing device are utilized to detect passing of the object 90.

Figure 8:
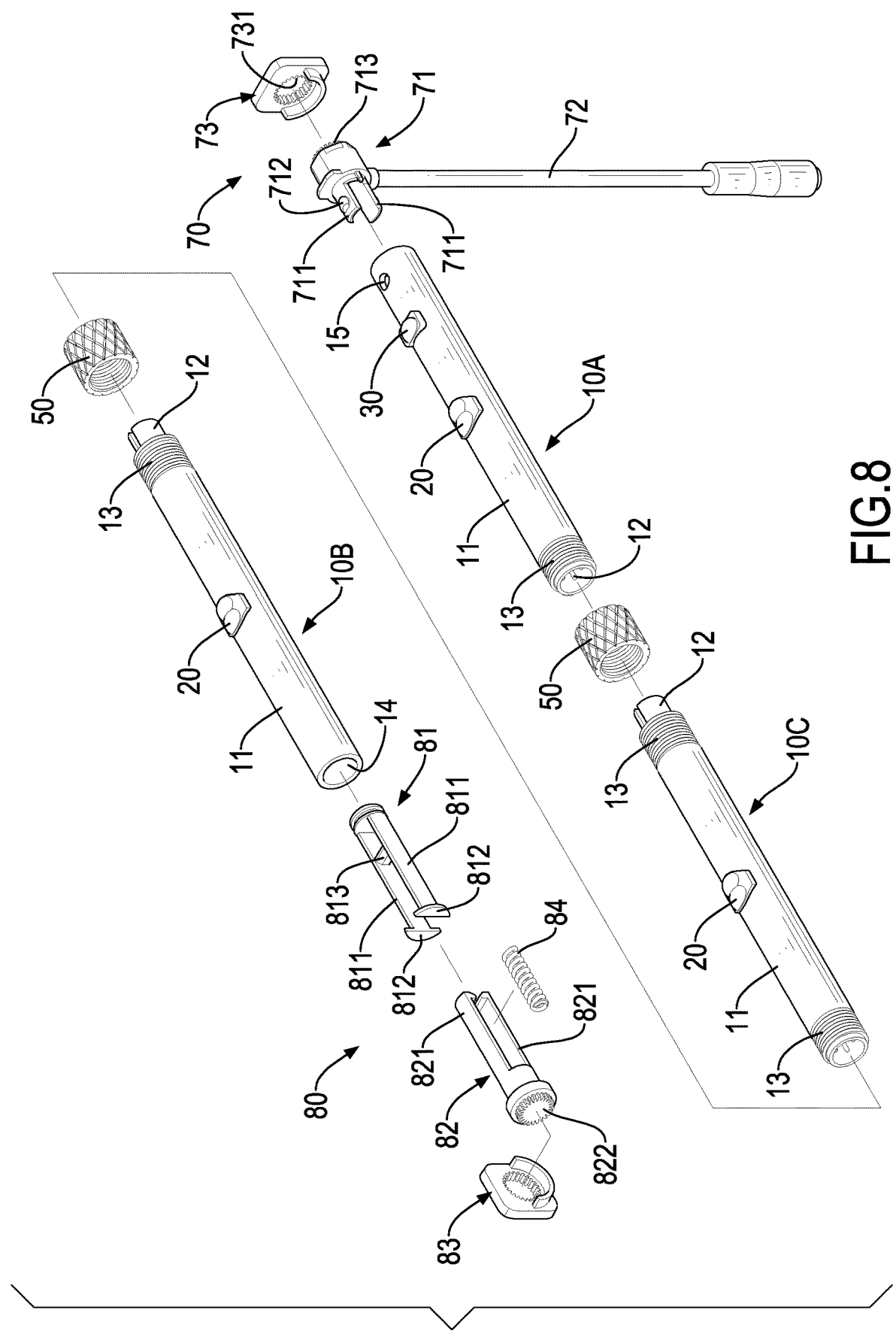
FIG. 8 is a perspective view of the modular sensing device of a third embodiment in accordance with the present invention.

With reference to FIG. 8, a third embodiment of the modular sensing device in accordance with the present invention is applied to the roller conveyor 100 as shown in FIG. 6. The third embodiment is similar to the first embodiment and the second embodiment. The third embodiment also has the assembling components 10, the object-detection sensors 20, the indicator light 30, the connecting nuts 50, the beginning installation assembly 70, and the terminal installation assembly 80. In the third embodiment, the jam nuts 60 are omitted. Each two connected threads 13 are merely connected by one of the connecting nuts 50.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A modular sensing device comprising:
   multiple assembling components detachably connected in sequence, extending along a direction, and having a beginning end and a terminal end disposed opposite each other, and each one of the multiple assembling components having
   a housing being tubular; and
   an electrical connecting device mounted inside the housing; and
   at least one object-detection sensor mounted to one of the multiple assembling components;
   wherein the housings of the multiple assembling components are detachably connected in sequence;
   the electrical connecting devices of the multiple assembling components are electrically connected in sequence and are electrically connected to the at least one object-detection sensor, and
   wherein the modular sensing device has an indicator light mounted to one of the multiple assembling components and electrically connected to the electrical connecting devices.

2. The modular sensing device as claimed in claim 1, wherein
   one of the multiple assembling components is defined as a beginning component, is disposed at the beginning end of the multiple assembling components, and has two opposite ends and an external thread disposed at one of the two opposite ends of the beginning component;

another one of the multiple assembling components is defined as a terminal component, is disposed at the terminal end of the multiple assembling components, and has two opposite ends and an external thread disposed at one of the two opposite ends of the terminal component;

the others of the multiple assembling components are defined as middle components, and each one of the middle components has two opposite ends and two external threads respectively disposed at the two opposite ends of the middle component;

the external threads of the beginning component, the middle components, and the terminal component are connected via connecting nuts;

each two of the external threads are connected by one of the connecting nuts, and the connecting nut is tightened by a jam nut.

3. The modular sensing device as claimed in claim 2, wherein the modular sensing device has a beginning installation assembly and a terminal installation assembly respectively connected to the beginning end and the terminal end of the multiple assembling components, and each one of the beginning installation assembly and the terminal installation assembly has an abutting unit.

4. The modular sensing device as claimed in claim 3, wherein
the beginning component has two engaging holes separately defined through the housing of the beginning component;
the beginning installation assembly has an installing unit having
two resilient arms being resilient and parallel to each other; and
two engaging protrusions respectively protruding from the two resilient arms and respectively engaging in the two engaging holes of the beginning component.

5. The modular sensing device as claimed in claim 4, wherein
the installing unit has
two opposite ends; and
an engaging portion disposed at one of the two opposite ends of the installing unit and having multiple teeth arranged circularly;
the two resilient arms are disposed at the other one of the two opposite ends of the installing unit;
the abutting unit of the beginning installation assembly has an engaging recess with multiple engaging notches arranged circularly;
the engaging recess of the abutting unit of the beginning installation assembly receives the engaging portion of the installing unit;
the multiple engaging notches of the engaging recess of the abutting unit of the beginning installation assembly are respectively meshed with the multiple teeth of the engaging portion of the installing unit.

6. The modular sensing device as claimed in claim 5, wherein
the terminal installation assembly has
a blocking unit inserted into the housing of the terminal component;
a pushing unit inserted into the housing of the terminal component and connected to the abutting unit of the terminal installation assembly; and
a resilient unit disposed between the blocking unit and the pushing unit and having two opposite ends respectively abutting against the blocking unit and the pushing unit.

7. The modular sensing device as claimed in claim 6, wherein
the pushing unit has
two opposite ends; and
an engaging portion disposed at one of the two opposite ends of the pushing unit and having multiple teeth arranged circularly;
the abutting unit of the terminal installation assembly has an engaging recess with multiple engaging notches arranged circularly;
the engaging recess of the abutting unit of the terminal installation assembly receives the engaging portion of the pushing unit; and
the multiple engaging notches of the engaging recess of the abutting unit of the terminal installation assembly are respectively meshed with the multiple teeth of the engaging portion of the pushing unit.

8. The modular sensing device as claimed in claim 7, wherein
the blocking unit has
two opposite ends;
two blocking arms extending from one of the two opposite ends of the blocking unit and being parallel to each other, and each one of the blocking arms having a terminal end; and
two blocking plates respectively disposed on the two terminal ends of the two blocking arms and abutting against the housing of the terminal component.

9. The modular sensing device as claimed in claim 8, wherein
the blocking unit has an abutting block disposed between and connected to the two blocking arms; and
the pushing unit has two hooks being resilient, extending from the engaging portion of the pushing unit, and hooking the abutting block.

10. The modular sensing device as claimed in claim 9, wherein the beginning installation assembly has a connecting cable connected to the installing unit and electrically connected to the electrical connecting device inside the beginning component.

11. The modular sensing device as claimed in claim 2, wherein
the modular sensing device has a beginning installation assembly connected to the beginning end of the multiple assembling components;
the beginning component has two engaging holes separately defined through the housing of the beginning component;
the beginning installation assembly has
an abutting unit;
an installing unit connected to the abutting unit of the beginning installation assembly and having
two resilient arms being resilient and parallel to each other; and
two engaging protrusions respectively protruding from the two resilient arms and respectively engaging in the two engaging holes of the beginning component.

12. The modular sensing device as claimed in claim 2, wherein
the modular sensing device has a beginning installation assembly connected to the beginning end of the multiple assembling components;

the beginning installation assembly has
  an installing unit having
    two opposite ends; and
    an engaging portion disposed at one of the two opposite ends of the installing unit and having multiple teeth arranged circularly; and
  an abutting unit having an engaging recess with multiple engaging notches arranged circularly;
  the engaging recess of the abutting unit of the beginning installation assembly receives the engaging portion of the installing unit; and
  the multiple engaging notches of the engaging recess of the abutting unit of the beginning installation assembly are respectively meshed with the multiple teeth of the engaging portion of the installing unit.

13. The modular sensing device as claimed in claim 2, wherein the modular sensing device has a terminal installation assembly connected to the terminal end of the multiple assembling components and having
  a blocking unit inserted into the housing of the terminal component;
  an abutting unit;
  a pushing unit inserted into the housing of the terminal component and connected to the abutting unit of the terminal installation assembly; and
  a resilient unit disposed between the blocking unit and the pushing unit and having two opposite ends respectively abutting against the blocking unit and the pushing unit.

14. The modular sensing device as claimed in claim 13, wherein the blocking unit is inserted into the housing of the terminal component and has
  two opposite ends;
  two blocking arms extending from one of the two opposite ends of the blocking unit and being parallel to each other, and each one of the blocking arms having a terminal end; and
  two blocking plates respectively disposed at the two terminal ends of the two blocking arms and abutting against the housing of the terminal component.

15. The modular sensing device as claimed in claim 2, wherein the modular sensing device has a terminal installation assembly connected to the terminal end of the multiple assembling components and the terminal installation assembly has
  a blocking unit inserted into the housing of the terminal component and having
    two opposite ends;
    two blocking arms extending from one of the two opposite ends of the blocking unit and being parallel to each other, and each one of the blocking arms having a terminal end; and
    an abutting block disposed between and connected to the two blocking arms; and
  a pushing unit inserted into the housing of the terminal component and having two hooks being resilient and hooking the abutting block.

16. The modular sensing device as claimed in claim 2, wherein
  the modular sensing device has a terminal installation assembly connected to the terminal end of the multiple assembling components;
  the terminal installation assembly has
    a pushing unit inserted into the housing of the terminal component and having
      two opposite ends; and
      an engaging portion disposed at one of the two opposite ends of the pushing unit and having multiple teeth arranged circularly; and
    an abutting unit having an engaging recess with multiple engaging notches arranged circularly;
  the engaging recess of the abutting unit of the terminal installation assembly receives the engaging portion of the pushing unit; and
  the multiple engaging notches of the engaging recess of the abutting unit of the terminal installation assembly are respectively meshed with the multiple teeth of the engaging portion of the pushing unit.

17. The modular sensing device as claimed in claim 1, wherein
  one of the multiple assembling components is defined as a beginning component, is disposed at the beginning end of the multiple assembling components, and has two opposite ends and an external thread disposed at one of the two opposite ends of the beginning component;
  another one of the multiple assembling components is defined as a terminal component, is disposed at the terminal end of the multiple assembling components, and has two opposite ends and an external thread disposed at one of the two opposite ends of the terminal component;
  the others of the multiple assembling components are defined as middle components, and each one of the middle components has two opposite ends and two external threads respectively disposed at the two opposite ends of the middle component;
  the external threads of the beginning component, the middle components, and the terminal component are connected via connecting nuts.

18. The modular sensing device as claimed in claim 1, wherein each one of the at least one object-detection sensor is an ultrasonic sensor.

19. A roller conveyor comprising:
  two side walls being parallel to each other;
  multiple rollers disposed between the two side walls;
  each one of the multiple rollers being rotatable and having two opposite ends respectively mounted to the two side walls; and
  a modular sensing device having
    multiple assembling components detachably connected in sequence, extending along a direction and having a beginning end and a terminal end disposed opposite each other, and each one of the multiple assembling components having
      a housing being tubular; and
      an electrical connecting device mounted inside the housing; and
    at least one object-detection sensor mounted to one of the multiple assembling components; and
    an indicator light mounted to one of the multiple assembling components;
  wherein the housings of the multiple assembling components are detachably connected in sequence; and
  the electrical connecting devices of the multiple assembling components are electrically connected in sequence and are electrically connected to the at least one object-detection sensor and the indicator light.

* * * * *